United States Patent [19]

Foster

[11] Patent Number: 5,685,982

[45] Date of Patent: Nov. 11, 1997

[54] VECTORED THRUST SHALE SHAKER

[76] Inventor: Mike L. Foster, 13376 FM 270, Lindale, Tex. 75771

[21] Appl. No.: 470,065

[22] Filed: Jun. 6, 1995

[51] Int. Cl.$^6$ .................. B01D 33/00; B01D 35/20; B07B 1/36; B07B 1/42

[52] U.S. Cl. .................. 210/385; 210/389; 209/326; 209/329; 209/366.5

[58] Field of Search .................................. 210/388, 389, 210/384, 385; 209/326, 325, 329, 366.5

[56] References Cited

U.S. PATENT DOCUMENTS

| | | |
|---|---|---|
| 2,246,483 | 6/1941 | Dillon . |
| 2,632,366 | 3/1953 | Ahlfors . |
| 4,340,469 | 7/1982 | Archer . |
| 4,632,751 | 12/1986 | Johnson . |
| 4,886,608 | 12/1989 | Cook . |
| 4,911,834 | 3/1990 | Murphy . |

*Primary Examiner*—Thomas M. Lithgow
*Attorney, Agent, or Firm*—Kenneth A. Roddy

[57] ABSTRACT

A vibratory vectored thrust shaker for separating solid materials from fluids has a base frame and a screen bed support frame carrying a mesh screen supported horizontally above the base frame by resilient supports. An eccentrically weighted vibratory shaft is rotatably mounted transversely between a pair of side rails secured at one end to the screen bed support frame near its discharge end which extend upward therefrom at an acute angle to horizontal. A first resilient round member is mounted at one end of the vibratory shaft. A drive motor mounted on a spring biased hinged mounting bracket connected to the base frame has a second resilient round member mounted on its drive shaft which is engaged in spring biased relation with the first round member. As the weighted portion of the vibratory shaft rotates to the point of tangency of the round members, centrifugal force is exerted angularly downward to compress them together and compress the hinged mounting bracket such that the angular downward force is substantially absorbed and relatively little movement is imparted to the screen bed. As the weighted portion of the vibratory shaft rotates to a point opposite the point of tangency of the round members, centrifugal force is exerted angularly upward allowing the round members and compression spring to expand creating a relatively large resultant angular upward force acting on the screen bed and materials to be separated are thrust in an angular direction toward the discharge end.

19 Claims, 4 Drawing Sheets

VECTORED THRUST SHALE SHAKER

BACKGROUND OF THE INVENTION

1. Field of the Invention

This invention relates generally to shale shakers, and more particularly to a directional shale shaker having an eccentrically weighted vibrator shaft coupled with rotating spring biased resilient pneumatic members which are alternately compressed under centrifugal force and released along with the stored compression and spring force to produce slower shorter motion at the discharge end of the shaker screen and faster longer motion at the inlet end of the screen to thrust cuttings toward the discharge end of the screen at an angle.

2. Brief Description of the Prior Art

Vibrating screen shale shakers of the type used in the oil industry to fall into three general categories, as described below.

"Elliptical motion", or "unbalanced design" shakers have a downward slope on the screen. This slope is required to properly transport cuttings across the screen an off the discharge end. However, the downward slope reduces the fluid retention time and limits the capacity of the machine. Optimum screening with these types of shakers is usually in the range of 30-40 mesh (400-600 microns). Bearing failure is also a common problem with these types of shakers.

In the late 1960' and early 1970's "circular motion", or "balanced design" shakers were introduced which produce a balanced, or generally circular motion. The consistent, circular vibration allows adequate solids transport with the basket in a flat, horizontal orientation. This type of shaker usually has multiple decks to split the solids load and allow the use of finer mesh screens in the range of 80–100 mesh (150–180 microns). However, these types of shakers are prone to short screen life in the 80 mesh and finer screens. Removal of solids finer than 100 mesh (180 microns) leads to screen "blinding" and loss of fluid across the screen. "Blinding" is known as the phenomenon where near-size particles plug the screen or the screen becomes coated with sticky particles. Bearing failure is also a common problem with these types of shakers, due to the belt drive creating uneven loading between the stationary motor and the rapidly moving vibration shaft.

More recently, "linear motion", or "straight-line motion" shakers were introduced which produce a generally straight motion. This motion is developed by a pair of eccentric shafts rotating in opposite directions. Linear motion shakers provide superior cutting conveyance and are able to operate at uphill slope which allows the use of 200 mesh screens (77 microns). However, this very same straight linear motion tends to drive the cuttings into the screen which also causes screen "blinding" and loss of fluid across the screen. Short motor life and bearing failure is also a common problem with these types of shakers, due to the extreme vibration.

Vibrator mechanisms vary widely in design and placement and greatly affect the throughput efficiency of screened shakers. Most modern shakers utilize linear motion vibration with the vibrator mechanism mounted above the screen bed. In some units, the vibration-inducing eccentric weights are separated from the drive motor, while in other the eccentric weights and motor form an integral assembly.

Stone, U.S. Pat. No. Re. 30,932 discloses a vibrator device comprising a pair of rotary shafts with off-center weights relatively oriented inside of an outer housing which can be connected to a screen element for agitating the screen element in a vibratory motion with a stronger impulse in one direction than in the other.

Musschoot, U.S. Pat. No. 4,152,255 discloses a vibratory screen apparatus having dual exciters positioned on either side of the center of gravity which directs vibrations at obtuse and acute angles through the center of gravity. The vibratory force of each exciter may be varied to cause vertical vibration or to convey in one direction or the opposite direction.

Dumbaugh et al, U.S. Pat. No. 4,287,056 discloses a flat stroke sifter screen having a vibratory exciter mounted at the inlet end and drive springs at the outlet end with a counterbalancing member having a tuning plate and stabilizers for the counterbalance, whereby the lateral vibratory action of the sifter is in the form of an elliptical motion adjacent the inlet end and a substantially straight back and forth, or axial motion adjacent the discharge end.

Murphy, U.S. Pat. No. 4,911,834 discloses a drilling mud separation system including a vibratory screen having a pair of laterally spaced motors mounted on the screen supporting member generally in the area of the center of gravity with their rotational axes extending at an angle relative to the horizontal and in a vertical plane parallel to the longitudinal axis of the screen bed. The apparatus produces a generally uniform linear motion and move the materials in a generally linear direction across the screen bed.

Poturaev et al, U.S. Pat. No. 4,986,422 discloses a screening apparatus including a box carrying a vibrator and a support frame with a screen and sieve secured thereto at an acute angle to a vertical plane wherein the materials are moved in a helical path from the loading end to the discharge end.

Most prior art shakers tend to force the cuttings upward from the screen surface and as they continue upward the screen travels down, and as the cuttings fall downward, the screen travels upward and strikes the cuttings which chips small pieces off and creates very fine cuttings that are extremely difficult to remove.

The present invention is distinguished over the prior art in general, and these patents in particular by a vibratory vectored thrust shaker having a horizontal base frame and a screen bed support frame carrying a mesh screen supported horizontally above the base frame by resilient supports. An eccentrically weighted vibratory shaft is rotatably mounted transversely between the upper ends of a pair of side rails secured at one end to the screen bed support frame near its discharge end which extend angularly upward therefrom at an acute angle to horizontal. A first resilient round member is mounted at one end of the vibratory shaft. A drive motor mounted on a spring biased hinged mounting bracket connected to the base frame has a second resilient round member mounted on its drive shaft which is engaged in spring biased relation with the first round member. As the weighted portion of the vibratory shaft rotates to the point of tangency of the round members, centrifugal force is exerted angularly downward to compress them together and compress the hinged mounting bracket such that the angular downward force is substantially absorbed and relatively little movement is imparted to the screen bed. As the weighted portion of the vibratory shaft rotates to a point opposite the point of tangency of the round members, centrifugal force is exerted angularly upward allowing the round members and compression spring to expand creating a relatively large resultant angular upward force acting on the screen bed and materials to be separated are thrust in an angular direction toward the discharge end.

The "vectored thrust" motion of the present invention greatly reduces the creation of very fine solids because the motion created is incremental in nature due to the compression of the resilient round members and spring under the motor. This allows the cuttings to travel down with the screen surface during its downward motion (compression stage) and then be thrust from the surface angularly upward at an angle toward the discharge end of the screen during the thrust stage.

SUMMARY OF THE INVENTION

It is therefore an object of the present invention to provide a vibratory vectored thrust shaker for separating solid materials from fluids which will thrust materials to be separated in an angular direction along a mesh screen bed toward the discharge end.

It is another object of this invention to provide a vibratory vectored thrust shaker for separating solid materials from fluids which will significantly improve cutting removal and reduce blinding of mesh screens by propelling the cuttings angularly upward at an angle toward the discharge end of the screen.

Another object of this invention to provide a vibratory vectored thrust shaker for separating solid materials from fluids which will significantly reduce the creation of very fine solids by causing the cuttings to travel downward with the screen surface during its downward motion and then be thrust from the surface angularly upward at an angle toward the discharge end of the screen.

Another object of this invention to provide a vibratory vectored thrust shaker for separating solid materials from fluids wherein the drive motor is isolated from vibration generated by eccentrically weighted rotating shafts to significantly wear and stress on the motor bearings and windings and increase motor longevity.

A further object of this invention is to provide a vibratory vectored thrust shaker for separating solid materials from fluids which will produce a slower shorter vibratory motion at the discharge end of a mesh screen and faster longer vibratory motion at the material receiving end the screen to launch cuttings toward the discharge end of the screen.

A still further object of this invention is to provide a vibratory vectored thrust shaker for separating solid materials from fluids which is simple in construction, economical to manufacture, and is rugged and reliable in operation.

Other objects of the invention will become apparent from time to time throughout the specification and claims as hereinafter related.

The above noted objects and other objects of the invention are accomplished by a vibratory vectored thrust shaker having a horizontal base frame and a screen bed support frame carrying a mesh screen supported horizontally above the base frame by resilient supports. An eccentrically weighted vibratory shaft is rotatably mounted transversely between the upper ends of a pair of side rails secured at one end to the screen bed support frame near its discharge end which extend angularly upward therefrom at an acute angle to horizontal. A first resilient round member is mounted at one end of the vibratory shaft. A drive motor mounted on a spring biased hinged mounting bracket connected to the base frame has a second resilient round member mounted on its drive shaft which is engaged in spring biased relation with the first round member. As the weighted portion of the vibratory shaft rotates to the point of tangency of the round members, centrifugal force is exerted angularly downward to compress them together and compress the hinged mounting bracket such that the angular downward force is substantially absorbed and relatively little movement is imparted to the screen bed. As the weighted portion of the vibratory shaft rotates to a point opposite the point of tangency of the round members, centrifugal force is exerted angularly upward allowing the round members and compression spring to expand creating a relatively large resultant angular upward force acting on the screen bed and materials to be separated are thrust in an angular direction toward the discharge end.

DESCRIPTION OF THE PREFERRED EMBODIMENT

Figure 1:
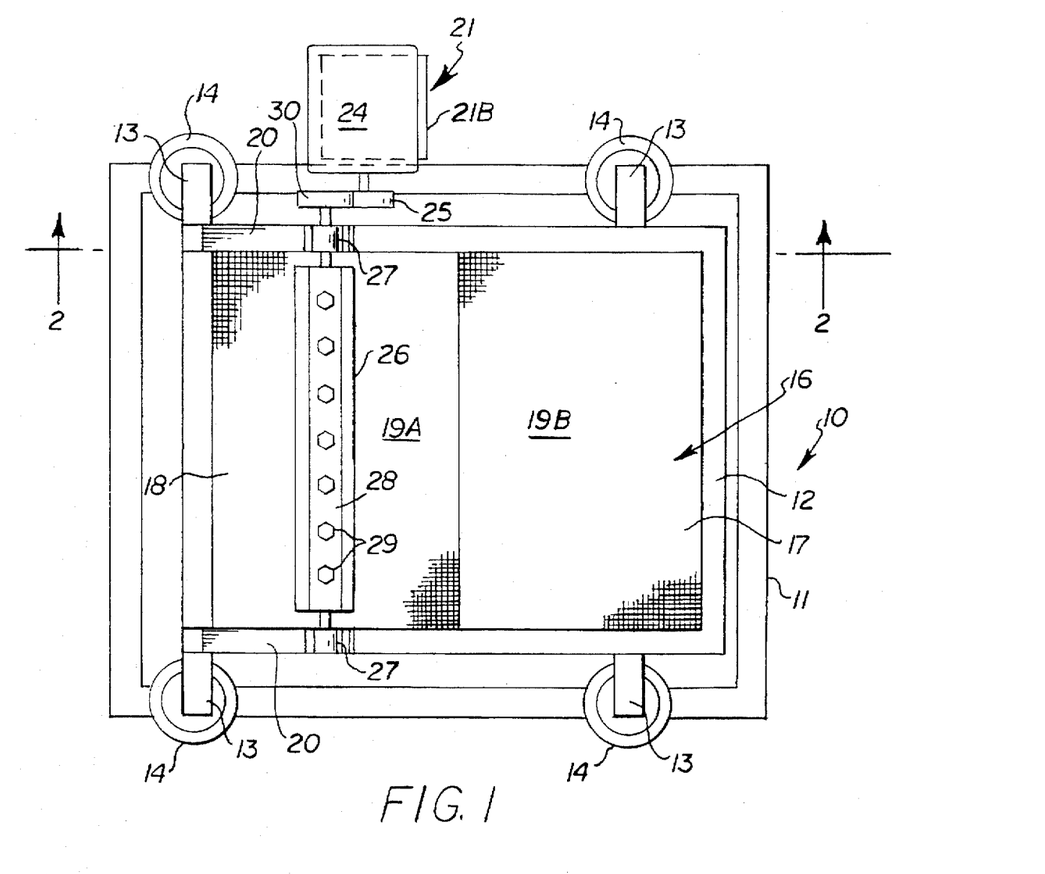
FIG. 1 is a top plan view of a vectored thrust shale shaker in accordance with the present invention.
Figure 2:
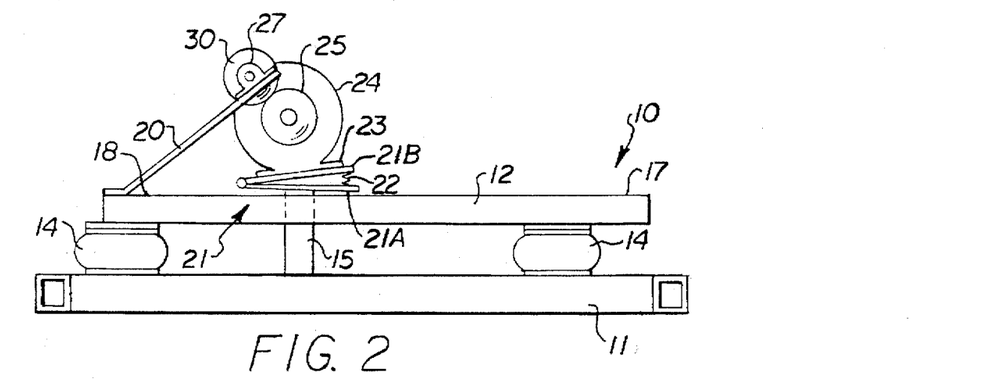
FIG. 2 is a side elevation of the vectored thrust shale shaker of FIG. 1 taken along line 2—2 of FIG. 1.

Referring now to FIGS. 1 and 2 of the drawings by numerals of reference, there is shown a preferred vectored thrust shale shaker 10 which is used to separate solids from fluids or drilling muds obtained from a well bore, and represents the best mode contemplated by the inventor.

The vectored thrust shale shaker 10 includes a generally rectangular lower base frame 11 supported on a supporting surface, such as a ground surface or floor, on which a generally rectangular screen bed support frame 12 is resiliently supported. The screen bed support frame 12 has outwardly extending brackets 13 adjacent its four corners and is resiliently supported in a horizontal position above the lower portion of the base frame 11 by four air spring members 14 mounted between the brackets and the base frame to permit vibratory movement of the screen bed support frame relative to the base frame. A vertical strut 15 extends upwardly from the base frame 11 and is spaced laterally outward from one side of the screen bed support frame to support an electric drive motor (described hereinafter) above the screen bed support frame.

The screen bed support frame 12 supports a screen bed 16 along which the materials to be separated flow and has a material receiving end 17 and an opposed discharge end 18. The screen bed 16 is formed of one or more screen panels 19A and 19B mounted therein, and each panel includes a wire or plastic mesh screen material of a predetermined mesh or size.

A pair of side rails 20 each secured at their lower ends to the screen bed support frame 12 near the material discharge end 18 extend angularly upward toward the material receiving end 17 at predetermined acute angle relative to the horizontal screen bed support frame to support the vibratory mechanism (described hereinafter) above the screen bed support frame.

A spring biased hinged motor mounting bracket 21 is secured to the top end of the vertical strut 15 of the base frame 11. The lower member 21A of the hinged bracket 21 is secured horizontally to the top end of the strut 15 and the upper member 21B is hinged at one end to the lower member and is pivotally movable relative thereto. A compression spring 22 is mounted between the unhinged ends of the hinge members 21A and 21B to normally urge them open at an acute angle relative to horizontal.

The base plate 23 of an electric drive motor 24 is mounted on the pivotally movable upper member 21B of the hinged bracket 21 to move therewith. A first resilient round member 25, such as a pneumatic tire, is mounted on the output shaft of the electric drive motor 24.

An eccentrically weighted shaft 26 extends transversely between the angular side rails 20 and is journalled at each end in pillow block members 27 secured to the raised outer ends of the rails. The mid section of the shaft 26 has a longitudinally extending flat surface. A rectangular weight 28 is secured to the flat surface of the shaft 26, such as by installing bolts 29 through holes in the plate into threaded holes in the flat surface, or by other suitable means.

A second resilient round member 30, such as a pneumatic tire, is mounted on the outer end of the shaft 26 and its circumference is engaged on the circumference of the first resilient round member 25 mounted on the drive shaft of the drive motor 24 and is driven by the first resilient round member to rotate the shaft 26. The compression spring 22 in the hinged motor mounting bracket 21 urges the first resilient round member 25 mounted on the shaft of the drive motor into firm engagement with the second resilient round member 30 and the resilient round members 25 and 30 rotate in opposite direction. The point of tangency of the resilient round member surfaces is at an angle perpendicular to the angle of the side rails 20 mounted on the screen bed support frame 12.

Figure 3:
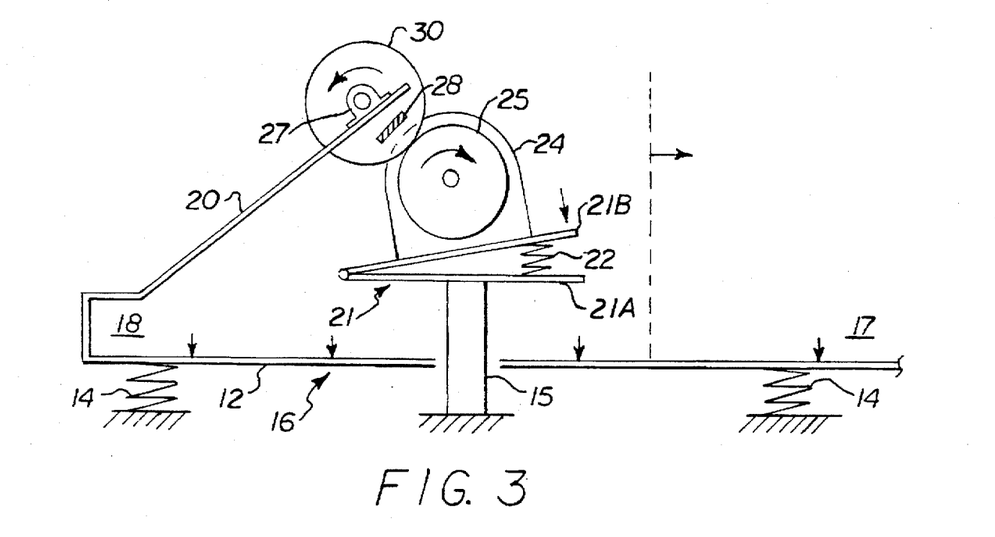
FIG. 3 is a schematic side elevation view showing the vibratory forces acting on the vectored thrust shale shaker when the resilient round members and compression spring are compressed.
Figure 4:
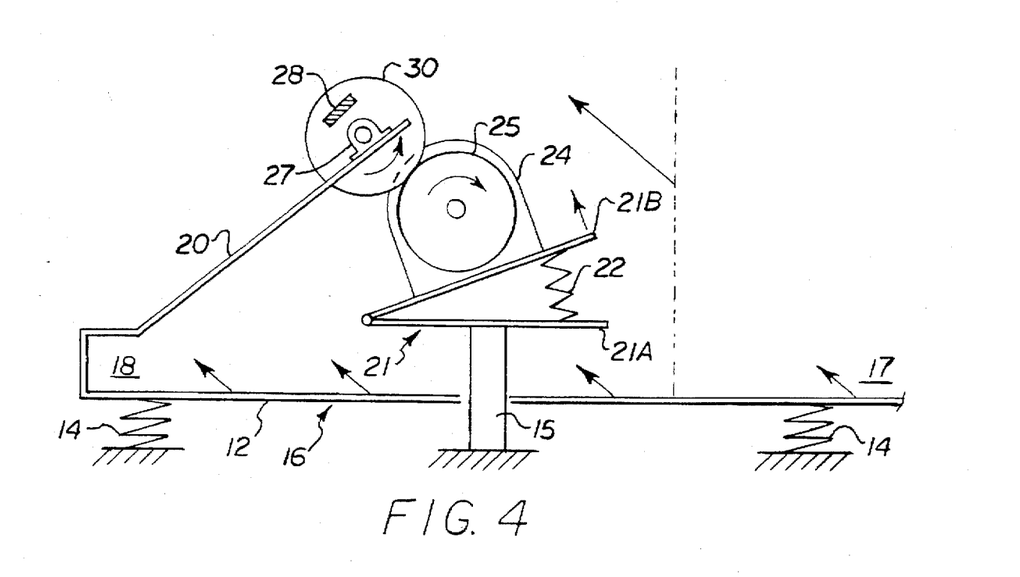
FIG. 4 is a schematic side elevation view showing the vibratory forces acting on the vectored thrust shale shaker when compressive forces on the resilient round members and compression spring are released.

Referring now to FIGS. 3 and 4, the apparatus is shown schematically and the resilient members 25 and 30 are shown enlarged to illustrate the resultant vibratory forces acting on the apparatus. The compression spring 22 in the bracket 21 urges the first resilient round member 25 mounted on the shaft of the drive motor into firm engagement with the second resilient round member 30 and the resilient members 25 and 30 rotate in opposite direction. As the eccentrically weighted shaft 26 rotates through 360°, its offset weight alternately compresses and releases the compression spring 22 in the hinged motor mounting bracket 21.

As shown in FIG. 3, when the weight 28 rotates to the point of tangency of the resilient round members 25 and 30, centrifugal force of the eccentrically weighted shaft is exerted on the tangent round members downward perpendicular to the angle of the side rails 20. The resilient round member 30 at the end of the weighted shaft is pressed into the resilient round member 25 mounted on the motor shaft against the force of the compression spring 22 compressing them together and storing resilient compression. This in turn compresses the compression spring 22 in the spring biased motor mounting bracket 21 and the resultant angular downward force acting on the screen bed support frame 12 is substantially absorbed and stored by the compression spring 22 and resilient members 25 and 30. Thus, the rearward horizontal component and downward vertical component of the angular downward force are very small and very little downward or rearward force is imparted to the screen bed support frame 12, and it assumes an "at-rest" position.

As shown in FIG. 4, as the weight 28 rotates to the position opposite the point of tangency of the resilient round members 25 and 30, the centrifugal force of the shaft is exerted upward at an angle perpendicular to the angle of the side rails 20 mounted on the screen bed support frame 12. At the same time, the force compressing the spring 22 of the hinged motor mounting bracket 21 and compressing the resilient round members 25 and 30 together is relieved. The resulting force created by the angularly upward component of the centrifugal force accompanied by the expanding relieved compression forces in the spring and resilient round members is a relatively large force exerted upward at an angle perpendicular to the angle of the side rails 20 mounted on the screen bed support frame 12. In this position, the forward horizontal component and upward vertical component of the angular force are relatively large and the large angular force is transmitted to the screen bed 16. This propels the cuttings on the screens upwardly and forwardly at an angle, for example 15°, relative to the screens, hence the term "vectored thrust".

Because the side rails 20 are secured at an acute angle relative to the horizontal screen bed support frame 12 supporting the screens, the forward horizontal force component is larger than the upward vertical force component, and because the side rails are secured near the discharge end, the combined alternating forces acting on the screen bed support frame 12 and screen bed 16 produce slower shorter vibratory motion at the discharge end 18 of the screen bed frame and faster longer vibratory motion at the material receiving end 17 of the screen bed frame to launch cuttings toward the discharge end of the screen bed.

As the eccentrically weighted shaft 26 continues rotation, the centrifugal force of the shaft is alternately exerted angularly downward to compress the resilient round members 25 and 30 together and compress the spring 22 allowing the screen bed 16, to assume the "at-rest" position (FIG. 3), and then release the stored forces to propel the cuttings upwardly and forwardly at an angle (FIG. 4). This "vectored thrust" motion provides excellent cuttings removal and significantly reduces blinding of the screen or screens.

This "vectored thrust" motion greatly reduces the creation of very fine solids because the motion created is incremental in nature due to the compression of the resilient round members and spring under the motor. This allows the cuttings to travel down with the screen surface during its downward motion (compression stage) and then be thrust from the surface angularly upward at an angle toward the discharge end of the screen during the thrust stage. Other prior art shakers tend to force the cuttings upward from the screen surface and as they continue upward the screen travels down, and as the cuttings fall downward, the screen travels upward and strikes the cuttings which chips small pieces off and creates very fine cuttings that are extremely difficult to remove.

Referring now to FIGS. 5, 6, 7, and 8 of the drawings, there are shown modifications which impart different force characteristics to the shaker. The components which have been previously shown and described are given the same numerals of reference, but their detailed description will not be duplicated to avoid repetition.

Figures 5, 6:
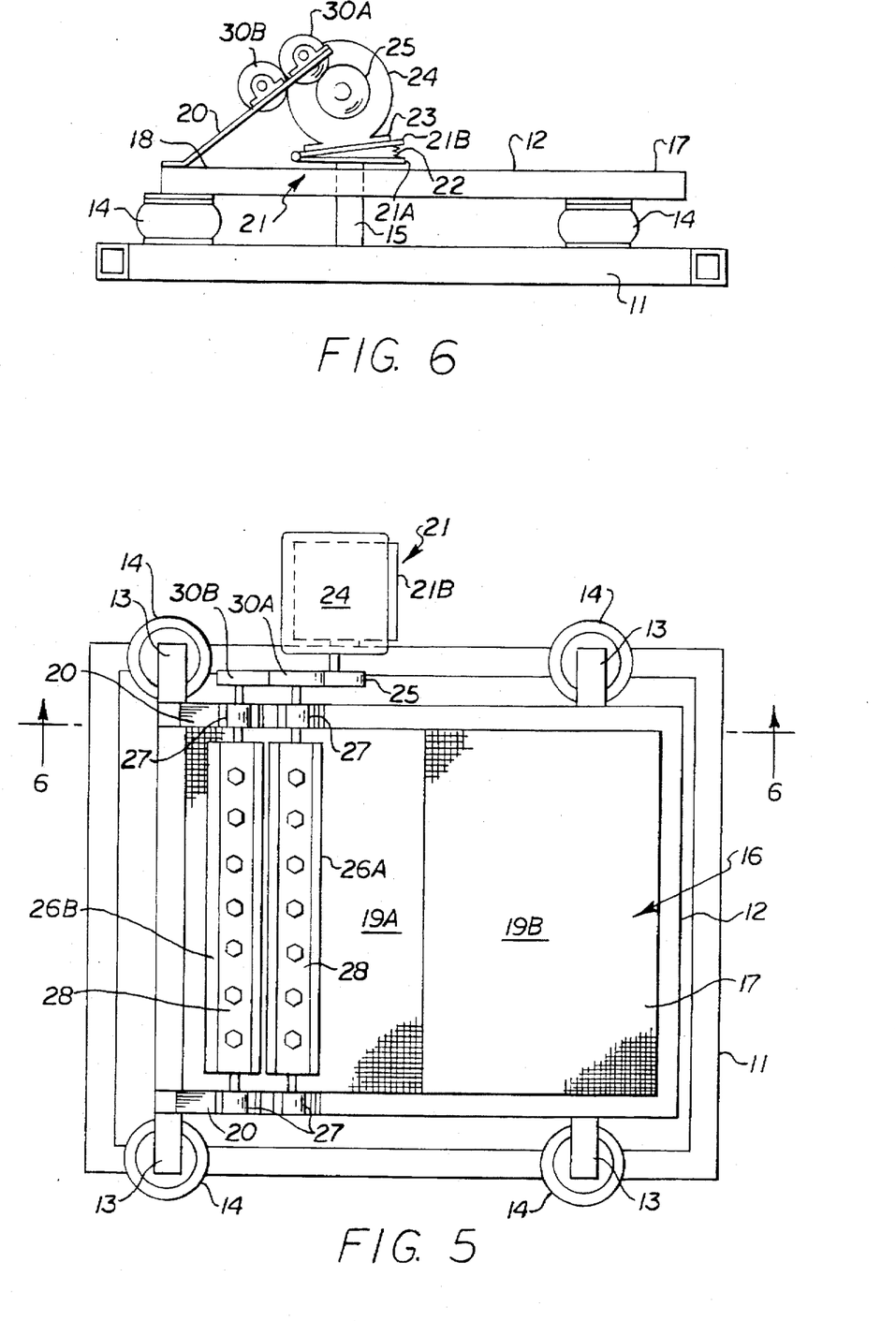
FIG. 5 is a top plan view of a vectored thrust shale shaker having a pair of vibratory shafts in accordance with the present invention.
FIG. 6 is a side elevation of the vectored thrust shale shaker of FIG. 5 taken along line 6—6 of FIG. 1.

FIGS. 5 and 6 show a modification wherein a pair of eccentrically weighted shafts 26A and 26B are each mounted transversely between the angular side rails 20 in parallel relation and journalled at each end in pillow block members 27 secured to the raised outer ends of the side rails. Each shaft 26A, 26B has a rectangular weight 28 is secured to its flat surface and are positioned to rotate in opposite directions in phase with each other. In this embodiment, there is a drive motor 24 mounted on the pivotally movable upper member 21B of the hinged bracket 21 to move therewith and a first resilient round member 25, such as a pneumatic tire, is mounted on the output shaft of the motor, as previously described.

A pair of resilient round members 30A and 30B, such as a pneumatic tires, are mounted one on the outer end of each shaft 26A, 26B with their circumferences engaged to rotate in opposite direction. One of the resilient round members 30A has its circumference engaged on the circumference of the first resilient round member 25 mounted on the drive shaft of the drive motor 24 to rotate the parallel weighted shafts 26A and 26B. The compression spring 22 in the hinged motor mounting bracket 21 urges the resilient round member 25 mounted on the shaft of the drive motor into firm engagement with the round member 30A.

In the embodiment of FIGS. 5 and 6, the eccentrically weighted shafts 26A and 26B rotating in opposite directions in phase with each other produces a more balanced uniform vibratory motion exerted to the screen bed support frame 12.

Figure 7:
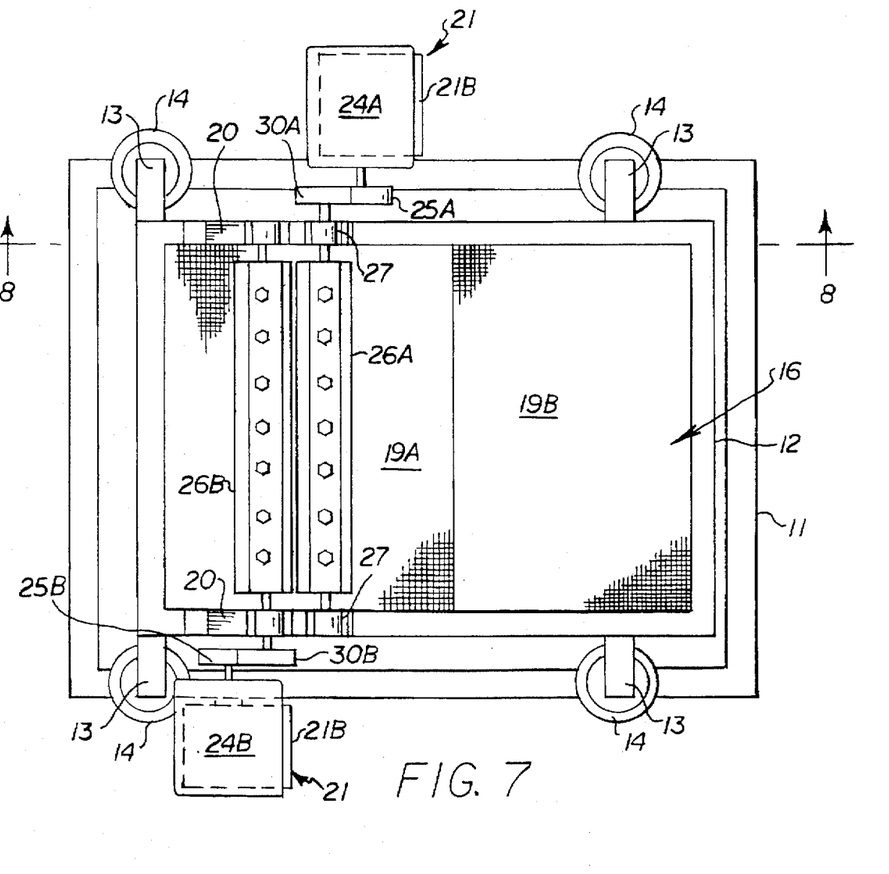
FIG. 7 is a top plan view of a vectored thrust shale shaker having a pair of drive motors and vibratory shafts in accordance with the present invention.
Figure 8:
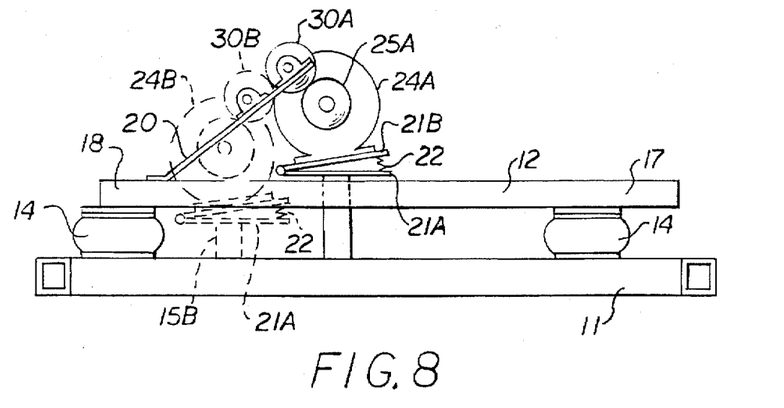
FIG. 8 is a side elevation of the vectored thrust shale shaker of FIG. 7 taken along line 7—7 of FIG. 7.

FIGS. 7 and 8 show another modification utilizing a pair of eccentrically weighted shafts 26A and 26B mounted transversely between the angular side rails 20 in parallel relation and journalled at each end in pillow block members 27 secured to the raised outer ends of the side rails. As previously described, each shaft 26A, 26B has a rectangular weight 28 secured to its flat surface and rotate in opposite directions in phase with each other.

In this embodiment, there are a pair of vertical strut members 15A and 15B extending upwardly from the base frame 11 adjacent opposed longitudinal sides of the screen bed support frame 12 and a spring biased hinged motor mounting bracket 21 is secured to the top end of each vertical strut. A pair of drive motors 24A and 24B, each mounted on the pivotally movable upper member 21B of a respective hinged bracket 21 to move therewith, as described previously. A pair of resilient round members 25A and 25B, such as a pneumatic tires, are mounted one on the output shaft of each motor.

A pair of resilient round members 30A and 30B, such as a pneumatic tires, are mounted one on the outer end of each shaft 26A, 26B on opposite sides of the screen bed support frame 12 with their circumferences engaged on the circumference of the round members 25A and 25B, respectively mounted on the drive shaft of the motor on their side of the frame. The compression springs 22 in the hinged motor mounting brackets 21 urge the resilient round members 25A and 25B mounted on the shaft of the motors into firm engagement with the round members 30A and 30B.

In the embodiment of FIGS. 7 and 8, the eccentrically weighted shafts 26A and 26B rotating in opposite directions in phase with each other produces a more balanced uniform vibratory motion exerted to the screen bed support frame. However, in this embodiment the resulting force created by the angularly upward component of the centrifugal force accompanied by the relieved stored compression forces in the dual springs and resilient round members is greater due to having more spring force and resilient surface area releasing the stored forces.

While this invention has been described fully and completely with special emphasis upon a preferred embodiment, it should be understood that within the scope of the appended claims the invention may be practiced otherwise than as specifically described herein.

I claim:

1. A vibratory vectored thrust shaker apparatus for separating solid materials from fluids comprising:

a base frame supported on a supporting surface;

a generally rectangular screen bed frame resiliently supported in a generally horizontal position above said base frame for vibratory movement relative thereto and having a material receiving end and an opposed discharge end spaced longitudinally therefrom;

a screen bed in said screen bed frame including at least one generally planar mesh screen for receiving solid materials and fluids to be separated by said at least one screen;

an eccentrically weighted vibratory shaft mounted transversely across said screen bed frame near said discharge end;

a drive motor mounted on said base frame having a drive shaft connected with said vibratory shaft for imparting rotation thereto; and resilient means connected between said vibratory shaft and said motor drive shaft to become resiliently compressed and substantially absorb the generally downward directed component of centrifugal force caused by said vibratory shaft and to become expanded as said vibratory shaft causes a generally upward directed component of centrifugal force to supply additional generally upward force, such that the resultant generally upward directed force and corresponding movement imparted to said screen bed frame is relatively larger than the resultant generally downward directed force and corresponding movement; and said vibratory shaft being mounted near said discharge end of said screen bed frame causes slower shorter vibratory motion at said discharge end and faster longer vibratory motion at said material receiving end of said screen bed frame to launch said solid materials on said screen bed toward said discharge end at an angle relative to said screen bed.

2. The shaker apparatus according to claim 1 wherein said resilient means comprises a first resilient member connected to said vibratory shaft and a second resilient member connected to said motor drive shaft and engaged with said first resilient member.

3. The shaker apparatus according to claim 2 wherein said first resilient member is a first round member mounted at one end of said vibratory shaft to rotate therewith;

said second resilient member is a second round member mounted on said motor drive shaft to rotate therewith; and the outer peripheries of said first and second round members are engaged such that said second round member drives said first round member to rotate said vibratory shaft.

4. The shaker apparatus according to claim 3 wherein a plurality of said eccentrically weighted vibratory shafts are mounted transversely across said screen bed frame near said discharge end, each having a said first round member connected at one end; and the outer peripheries of said first round members are engaged and the outer periphery of one said round member is engaged with said second round member such that said second round member drives said first round members to rotate adjacent ones of said plurality of vibratory shafts in opposite direction.

5. The shaker apparatus according to claim 1 wherein said drive motor is pivotally mounted on said base frame to pivot relative thereto and has a resilient compressible means disposed between said motor and said base frame to normally urge said motor away from said base frame an angle toward said discharge end; and said motor drive shaft is engaged in spring biased relation with said resilient means by the force of said resilient compressible means to rotate said vibratory shaft;

said resilient means connected between said vibratory shaft and said motor drive shaft and said resilient compressible means disposed between said motor and said base frame becoming resiliently compressed to substantially absorb the generally downward directed component of centrifugal force caused by said vibratory shaft and becoming expanded as said vibratory shaft causes a generally upward directed component of centrifugal force to supply additional generally upward force.

6. The shaker apparatus according to claim 5 wherein said resilient means connected between said vibratory shaft and said motor drive shaft comprises a first resilient member connected to said vibratory shaft and a second resilient member connected to said motor drive shaft and engaged with said first resilient member.

7. The shaker apparatus according to claim 6 wherein said first resilient member is a first round member mounted at one end of said vibratory shaft to rotate therewith;

said second resilient member is a second round member mounted on said motor drive shaft to rotate therewith; and the outer peripheries of said round members are engaged such that said second round member drives said first round member to rotate said vibratory shaft.

8. The shaker apparatus according to claim 7 wherein a plurality of said eccentrically weighted vibratory shafts are mounted transversely across said screen bed frame near said discharge end, each having a said first round member connected at one end to rotate therewith; and the outer peripheries of said first round members are engaged and the outer periphery of one said round member is engaged with said second round member such that said second round member drives said first round members to rotate adjacent ones of said plurality of vibratory shafts in opposite direction.

9. The shaker apparatus according to claim 7 wherein a plurality of said eccentrically weighted vibratory shafts are mounted transversely across said screen bed frame near said discharge end, each having a said first round member connected at one end to rotate therewith; and a plurality of said drive motors are pivotally mounted on said base frame to pivot relative thereto and each has a said resilient compressible means disposed between said motor and said base frame to normally urge said motor away from said base frame an angle toward said discharge end and each has a said second round member mounted on its motor drive shaft to rotate therewith; and the outer peripheries of adjacent ones of said first round members are engaged and the outer periphery of the outermost ones of said first round members are engaged with one of said second round members such that said second round members drive said first round members to rotate adjacent ones of said plurality of vibratory shafts in opposite direction.

10. A vibratory vectored thrust shaker apparatus for separating solid materials from fluids comprising:

a base frame supported on a supporting surface and having a vertical strut extending upwardly from one side;

a generally rectangular screen bed frame supported in a generally horizontal position above said base frame and having a material receiving end and an opposed discharge end spaced longitudinally therefrom, and a pair of parallel side rails each secured at one end to a longitudinal side of said screen bed frame near said discharge end and extending angularly upward therefrom at an acute angle to horizontal;

resilient support means between said base frame and said screen bed frame for supporting said screen bed frame above said base frame for vibratory movement relative thereto;

a screen bed in said screen bed frame including at least one generally planar mesh screen for receiving solid materials and fluids to be separated by said at least one screen;

an eccentrically weighted vibratory shaft rotatably mounted transversely between the upper ends of said side rails and having a first resilient round member mounted at one end thereof;

a motor bracket having a lower horizontal element secured to said strut, an upper movable element hinged at one end to said horizontal element and extending angularly upward and outward from the hinged connection, and a compression spring disposed between the unhinged ends of said upper and lower elements to normally urge them apart;

a drive motor mounted on said motor bracket upper element to pivot therewith and having a second resilient round member mounted on its drive shaft; and said second resilient round member engaged in spring biased relation with said first resilient round member by the force of said compression spring means to rotate said vibratory shaft; such that as the weighted portion of said vibratory shaft rotates to the point of tangency of said round members, centrifugal force is exerted angularly downward to compress said round members together and compress said compression spring and the angular downward force is substantially absorbed and relatively little movement is imparted to said screen bed frame;

as the weighted portion of said eccentrically weighted shaft rotates to a point opposite the point of tangency of said round members, centrifugal force is exerted angularly upward allowing said round members and said compression spring to expand creating a relatively large resultant angular upward force acting on said screen bed frame and the materials to be separated are thrust in an angular direction toward said discharge end.

11. In a vibratory vectored thrust shaker apparatus for separating solid materials from fluids of the type having a base frame supported on a supporting surface, a generally rectangular screen bed frame resiliently supported in a generally horizontal position above the base frame for vibratory movement relative thereto and having a material receiving end and an opposed discharge end spaced longitudinally therefrom, and a screen bed in said screen bed frame including at least one generally planar mesh screen for receiving solid materials and fluids to be separated by said at least one screen:

an eccentrically weighted vibratory shaft mounted transversely across said screen bed frame near said discharge end;

a drive motor mounted on said base frame having a drive shaft connected with said vibratory shaft for imparting rotation thereto; and resilient means connected between said vibratory shaft and said motor drive shaft to become resiliently compressed and substantially absorb the generally downward directed component of centrifugal force caused by said vibratory shaft and to become expanded as said vibratory shaft causes a generally upward directed component of centrifugal force to supply additional generally upward force, such that the resultant generally upward directed force and corresponding movement imparted to said screen bed frame is relatively larger than the resultant generally downward directed force and corresponding movement; and said vibratory shaft being mounted near said discharge end of said screen bed frame causes slower shorter vibratory motion at said discharge end and faster longer vibratory motion at said material receiving end of said screen bed frame to launch said solid materials on said screen bed toward said discharge end at an angle relative to said screen bed.

12. The shaker apparatus according to claim 11 wherein said resilient means comprises a first resilient member connected to said vibratory shaft and a second resilient member connected to said motor drive shaft and engaged with said first resilient member.

13. The shaker apparatus according to claim 12 wherein said first resilient member is a first round member mounted at one end of said vibratory shaft to rotate therewith;

said second resilient member is a second round member mounted on said motor drive shaft to rotate therewith; and the outer peripheries of said first and second round members are engaged such that said second round member drives said first round member to rotate said vibratory shaft.

14. The shaker apparatus according to claim 13 wherein a plurality of said eccentrically weighted vibratory shafts are mounted transversely across said screen bed frame near said discharge end, each having a said first round member connected at one end; and the outer peripheries of said first round members are engaged and the outer periphery of one said round member is engaged with said second round member such that said second round member drives said first round members to rotate adjacent ones of said plurality of vibratory shafts in opposite direction.

15. The shaker apparatus according to claim 11 wherein said drive motor is pivotally mounted on said base frame to pivot relative thereto and has a resilient compressible means disposed between said motor and said base frame to normally urge said motor away from said base frame an angle toward said discharge end; and said motor drive shaft is engaged in spring biased relation with said resilient means by the force of said resilient compressible means to rotate said vibratory shaft;

said resilient means connected between said vibratory shaft and said motor drive shaft and said resilient compressible means disposed between said motor and said base frame becoming resiliently compressed to substantially absorb the generally downward directed component of centrifugal force caused by said vibratory shaft and becoming expanded as said vibratory shaft causes a generally upward directed component of centrifugal force to supply additional generally upward force.

16. The shaker apparatus according to claim 15 wherein said resilient means connected between said vibratory shaft and said motor drive shaft comprises a first resilient member connected to said vibratory shaft and a second resilient member connected to said motor drive shaft and engaged with said first resilient member.

17. The shaker apparatus according to claim 16 wherein said first resilient member is a first round member mounted at one end of said vibratory shaft to rotate therewith;

said second resilient member is a second round member mounted on said motor drive shaft to rotate therewith; and the outer peripheries of said round members are engaged such that said second round member drives said first round member to rotate said vibratory shaft.

18. The shaker apparatus according to claim 17 wherein a plurality of said eccentrically weighted vibratory shafts are mounted transversely across said screen bed frame near said discharge end, each having a said first round member connected at one end to rotate therewith; and the outer peripheries of said first round members are engaged and the outer periphery of one said round member is engaged with said second round member such that said second round member drives said first round members to rotate adjacent ones of said plurality of vibratory shafts in opposite direction.

19. The shaker apparatus according to claim 17 wherein a plurality of said eccentrically weighted vibratory shafts are mounted transversely across said screen bed frame near said discharge end, each having a said first round member connected at one end to rotate therewith; and a plurality of said drive motors are pivotally mounted on said base frame to pivot relative thereto and each has a said resilient compressible means disposed between said motor and said base frame to normally urge said motor away from said base frame an angle toward said discharge end and each has a said second round member mounted on its motor drive shaft to rotate therewith; and the outer peripheries of adjacent ones of said first round members are engaged and the outer periphery of the outermost ones of said first round members are engaged with one of said second round members such that said second round members drive said first round members to rotate adjacent ones of said plurality of vibratory shafts in opposite direction.

* * * * *